(12) United States Patent
Patrascu et al.

(10) Patent No.: US 8,943,461 B2
(45) Date of Patent: *Jan. 27, 2015

(54) STEPWISE TEMPLATE INTEGRATION METHOD AND SYSTEM

(75) Inventors: Vasile Patrascu, San Jose, CA (US); Rishi Vaish, San Carlos, CA (US)

(73) Assignee: International Business Machines Corporation, Armonk, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 13/619,659

(22) Filed: Sep. 14, 2012

(65) Prior Publication Data

US 2013/0019223 A1  Jan. 17, 2013

Related U.S. Application Data

(63) Continuation of application No. 12/592,727, filed on Nov. 30, 2009, now Pat. No. 8,332,806, which is a continuation-in-part of application No. 11/062,068, filed on Feb. 18, 2005.

(51) Int. Cl.
*G05B 19/42* (2006.01)
*G06F 19/00* (2011.01)
(Continued)

(52) U.S. Cl.
CPC ............... *G06F 9/4436* (2013.01); *G06F 8/20* (2013.01); *G06Q 10/06* (2013.01)
USPC ............. 717/100; 700/89; 700/107; 717/102; 717/104; 718/102; 718/107

(58) Field of Classification Search
CPC ... G06Q 10/06; G06Q 10/10; G06Q 10/0633; G06F 11/3664; G06F 17/3089; G06F 17/30864; G06F 17/50; G06F 17/5004; G06F 8/20; G06F 9/54; G06F 9/4436
See application file for complete search history.

(56) References Cited

U.S. PATENT DOCUMENTS 5,721,912 A * 2/1998 Stepczyk et al. .............. 718/107
5,930,512 A  7/1999 Boden et al.
(Continued)

OTHER PUBLICATIONS

Sayal, Mehmet et al., Integrating Workflow Management Systems with Business-to-Business Interaction Standards, Proceedings of the 18th International Conference on Data Engineering, 2002, IEEE Computer Society, Washington, DC, United States.

(Continued)

*Primary Examiner* — Don Wong
*Assistant Examiner* — Anibal Rivera
(74) *Attorney, Agent, or Firm* — Patterson & Sheridan, LLP

(57) ABSTRACT

A method, apparatus and computer program product is provided to create an integration process between a source system and target system. The method includes creating a mapping between one or more source objects and one or more target objects and generating a complete workflow as part of an integration process between a respective source system and target system. A limited subset of operations is selectively included from a sequence of activities in the complete workflow that interact with the one or more source objects and one or more target objects. The limited subset of operations selected from the complete workflow is sequenced in a stepwise template that streamlines the integration process between the source system and target system, by focusing on mappings between and operations performed upon source objects and target objects associated with the limited subset of operations selected from the operations in the complete workflow.

16 Claims, 14 Drawing Sheets

(51) Int. Cl.
*G06F 9/44* (2006.01)
*G06F 9/46* (2006.01)
*G06Q 10/06* (2012.01)

(56) References Cited

U.S. PATENT DOCUMENTS

| | | | |
|---|---|---|---|
| 6,639,687 | B1 | 10/2003 | Neilsen |
| 6,662,237 | B1 | 12/2003 | Leckie |
| 6,725,445 | B1 | 4/2004 | Leymann et al. |
| 6,772,407 | B1 | 8/2004 | Leymann et al. |
| 7,139,999 | B2 | 11/2006 | Bowman-Amuah |
| 7,225,411 | B1 | 5/2007 | Stoner et al. |
| 7,496,887 | B2 | 2/2009 | Grasselt et al. |
| 7,653,562 | B2 | 1/2010 | Schulz et al. |
| 8,332,806 | B2 | 12/2012 | Patrascu et al. |
| 2001/0055017 | A1 | 12/2001 | Ording |
| 2002/0055664 | A1 | 5/2002 | Liu |
| 2002/0174000 | A1* | 11/2002 | Katz et al. ............... 705/7 |
| 2003/0083910 | A1* | 5/2003 | Sayal et al. ............... 705/7 |
| 2003/0225789 | A1 | 12/2003 | Bussler et al. |
| 2004/0068509 | A1 | 4/2004 | Garden et al. |
| 2004/0133457 | A1 | 7/2004 | Sadiq et al. |
| 2004/0187091 | A1* | 9/2004 | Parasnis et al. ............. 717/104 |
| 2004/0261063 | A1 | 12/2004 | Wang et al. |
| 2005/0021513 | A1 | 1/2005 | Vedula et al. |
| 2005/0027681 | A1 | 2/2005 | Bernstein et al. |
| 2005/0049906 | A1 | 3/2005 | Leymann et al. |
| 2005/0055664 | A1 | 3/2005 | Kloppmann et al. |
| 2005/0096932 | A1* | 5/2005 | Fernandez et al. ............... 705/1 |
| 2005/0149484 | A1 | 7/2005 | Fox et al. |
| 2005/0222965 | A1 | 10/2005 | Chaudhuri et al. |
| 2006/0190931 | A1 | 8/2006 | Scott et al. |
| 2006/0224702 | A1* | 10/2006 | Schmidt et al. ............... 709/219 |
| 2007/0006122 | A1 | 1/2007 | Bailey et al. |
| 2008/0270971 | A1* | 10/2008 | Agrawal et al. ............... 717/102 |
| 2008/0281659 | A1 | 11/2008 | Kloppmann et al. |
| 2009/0119334 | A1* | 5/2009 | Ahern et al. ............... 707/100 |
| 2009/0171708 | A1* | 7/2009 | Bobak et al. ............... 705/7 |
| 2010/0106551 | A1* | 4/2010 | Koskimies et al. ............ 718/102 |
| 2010/0121668 | A1* | 5/2010 | Hohmann ............... 700/89 |
| 2010/0241471 | A1* | 9/2010 | Nylander et al. ............. 700/107 |
| 2010/0241477 | A1* | 9/2010 | Nylander et al. ............. 705/8 |
| 2011/0131545 | A1 | 6/2011 | Patrascu et al. |

OTHER PUBLICATIONS

Gottschalk, Florian et al., Configurable Workflow Models, International Journal of Cooperative Information Systems, Mar. 10, 2008, World Scientific Publishing, Singapore.

Joeris, Gregor et al., Managing Evolving Workflow Specifications, Proceedings of the 3rd IFCIS International Conference on Cooperative Information Systems, 1998, pp. 310-321, IEEE Computer Society, Washington, DC, United States.

\* cited by examiner

FIG. 7

| FILE | EDIT | VIEW | PROJECT | ORCHESTRATION | MAP | TOOLS | SOLUTIONS | MY CLOUD |

CONFIGURATION-WIZARD ⊠

CONFIGURATION — EDIT LOGIN INFORMATION FOR SAP ENDPOINT.

1. INTRODUCTION
2. EDIT LOGIN INFORMATION FOR SAP ENDPOINT.
3. VERIFY SAP CONNECTIVITY
4. EXTRACT SAP CUSTOMER
5. COMPLETE SAP CONNECTIVITY
6. CREATE BUSINESS RULES FOR DATA VALIDATION
7. VERIFY SALESFORCE.COM CONNECTIVITY
8. MAP CUSTOMER DATA

CREDENTIALS

PLEASE ENTER YOUR SAP SERVER HOST (*SAP HOST*), USERNAME (*SAP USER*) AND PASSWORD (*SAP PW*). WE WILL USE THESE LATER TO CONNECT TO THE SAP INSTANCE.

| NAME | TYPE | VALUE |
|---|---|---|
| SFDC_LOGIN | STRING | CIMTKDEMO@YAHOO.COM |
| SFDC_PASSWORD | PASSWORD | •••••••• |
| SAPHOST | STRING | /H/10.198.78.3/H/194.11.1... |
| SAPCLIENT | STRING | 800 |
| SAPUSER | STRING | CISI |
| SAPSYSTEM | STRING | 02 |
| SAPPW | PASSWORD | •••••••• |

[<BACK] [NEXT>] [FINISH] [CLOSE] [HELP]

YOU'RE LOGGED IN AS RISHI@CASTIRON.COM  [LOGOUT]  54M OF 520M

*FIG. 8B*

STEPWISE TEMPLATE INTEGRATION METHOD AND SYSTEM

This application is a continuation of co-pending U.S. patent application Ser. No. 12/592,727, filed Nov. 30, 2009, which is a continuation-in-part of co-pending U.S. patent application Ser. No. 11/062,068, filed Feb. 18, 2005. The aforementioned related patent applications are herein incorporated by reference in their entirety.

BACKGROUND

Many companies leverage computer systems and software applications to improve their efficiency and organization in business. Often these systems are integrated together allowing information from one software application or system to be used or analyzed by another software application or system. Benefits associated with integrating and using these computer systems and software in business are numerous and include tighter control over inventory, improved financial forecasting, expedited internal and external information-flow and sales force automation.

Initially, the many benefits of having integrated applications and computer systems justify the cost of hiring a large information technology (IT) staff. These IT staff members may develop custom code and procedures to keep these computer systems operational and communicating with each other. As the computer systems and applications grow, so do the costs of managing an increasing larger IT staff. Eventually, the cost of managing the IT staff outstrips the medium to long-term cost-benefit of having the integrated computer systems.

In many cases, the complexity of integrating these large computer systems and software applications is a cost-prohibitive task. Systems integration projects increasingly require individuals with specialized knowledge of applications, protocols, communications, hardware and other areas. Consequently, customized development is completed using consultants or outsourced to system integrators that specialize in integrating large scale systems. The solutions involve integrating the data and business logic between several existing applications and frequently involve complex solutions. Because the work is outsourced and complex, these customized solutions are often expensive and difficult to complete in a reasonable time frame.

In attempt to reduce costs and expedite the integration, many companies are exploring system integration tools/methodologies as an alternative to customized software development. These solutions include enterprise application integration (EAI) solutions and application server technologies. The EAI solution provides a solution to some of the system integration problems but requires a company to commit to a proprietary platform. Despite these efforts, many of the EAI solutions remain complicated to use and understand. For example, conventional EAI solutions do not necessarily give a user any guidance in starting the integration process or the necessary steps to perform.

SUMMARY

One aspect of the present invention includes a method, apparatus and computer program product to create an integration process between a source system and target system. The integration method and system includes creating a mapping between one or more source objects and one or more target objects as part of an integration process between a respective source system and target system. The mapping between objects is used in generating a complete workflow as a further part of the integration process. The complete workflow has a sequence of activities that specifies operations on the one or more source objects and one or more target objects as between the respective source system and target system. Next, one implementation selectively includes a limited subset of operations from the sequence of activities in the complete workflow that interact with the one or more source objects and one or more target objects. These selective objects, operations and activities are identified as generally needing modification when performing an integration process. Once identified, method and systems of the present invention sequence the limited subset of operations selected from the complete workflow in a stepwise template that streamlines the integration process between the source system and target system. The subset of operations focus on mappings between and operations performed upon source objects and target objects associated with the limited subset of operations selected from the operations in the complete workflow.

The details of one or more embodiments of the invention are set forth in the accompanying drawings and the description below. Other features and advantages of the invention will become apparent from the description, the drawings, and the claims.

BRIEF DESCRIPTION OF THE SEVERAL VIEWS OF THE DRAWINGS

FIG. 7 illustrates the interface of a stepwise template integration process in accordance with one implementations of the present invention;

FIGS. 8A and 8B illustrate a different stepwise template integration process in accordance with aspects of the present invention;

Like reference numbers and designations in the various drawings indicate like elements.

DETAILED DESCRIPTION

Aspects of the present invention provide one or more of the following advantages. Large scale complex integrations between a source system and a target system can be greatly streamlined for a wide range of users. The streamlined integration starts with a detailed complete workflow describing the integration processing between the source systems and target systems. Selected operations from the complete workflow are included in the streamline integration yet the complete workflow is kept intact. These selected operations are presented to a user as a stepwise sequence of operations necessary for completing the integration. Users given the stepwise sequence are guided through the overall integration process with only a limited subset of operations from the complete workflow. This streamlines the integration process as the users are given a limited sequence of operations to perform and not the complete workflow to consider or manipulate.

Customized objects in either a source system or target system may also be included in the streamlined integration process. Aspects of the present invention carefully identify customized objects from the source and target system for incorporation into the streamlined integration process. Special cases are not required to include these customized objects as the metadata for unmodified objects and customized objects are accessed and compared. Underlying customized objects from the complete workflow are included for the user in the streamlined integration process to emphasize their importance.

In certain cases, aspects of the present invention provide visual indicators to make the streamline integration process easier to use. For example, a customized source object may be highlighted in a predetermined color, such as red, in a stepwise template integration process presented to a user. The predetermined color may indicate that a user performing the integration should focus on the customized objects to ensure a mapping between the fields of the objects is both complete and accurate. This is important for the enterprises that frequently customize the source systems and target systems for their business. For example, an enterprise may have performed many customizations to an SAP® Accounting package (e.g., the source system) and a Salesforce® lead system (e.g., the target system) prior to integrating them together.

Figure 1:
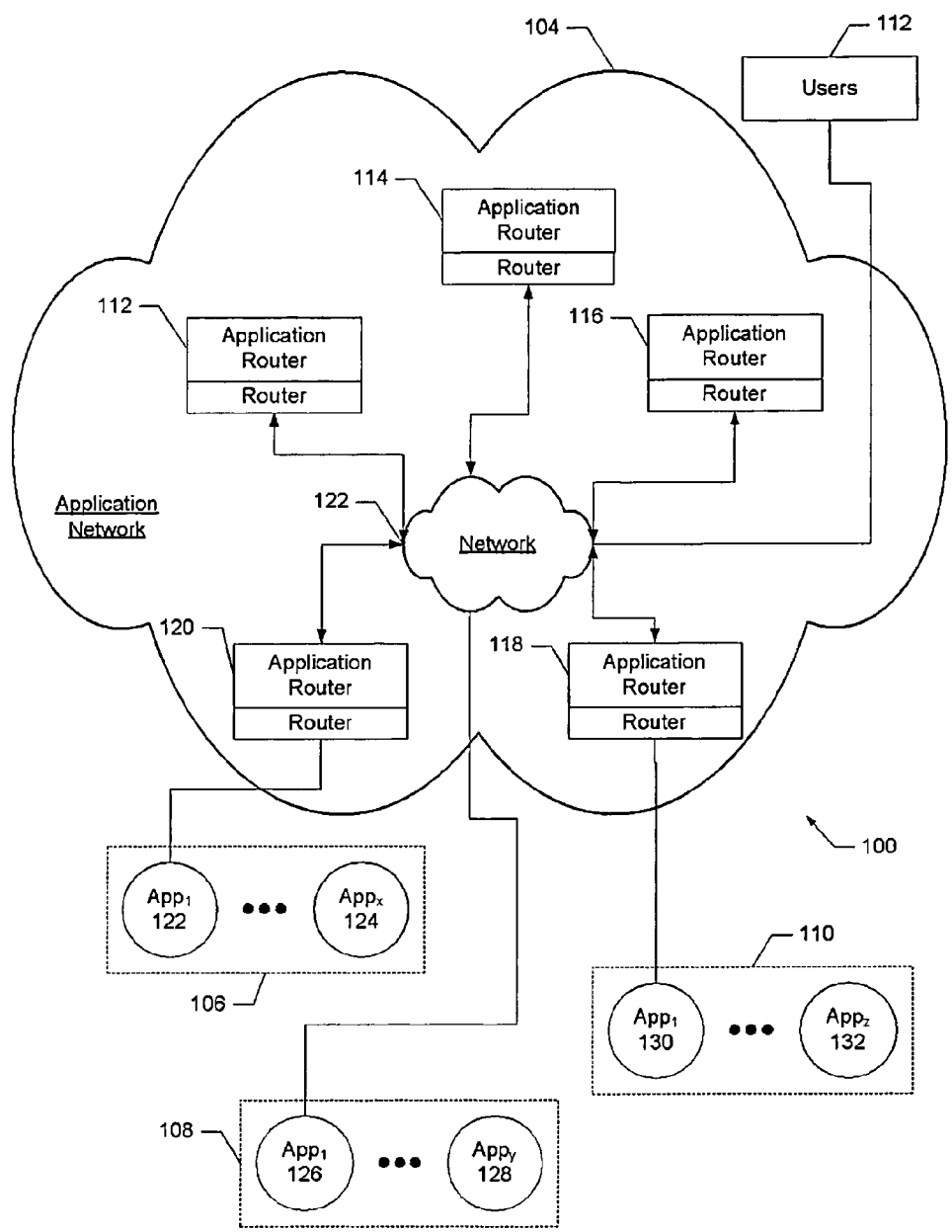
FIG. 1 is a block diagram illustrating a system using application routers in an application network in accordance with one implementation of the present invention.

FIG. 1 is a block diagram illustrating a system 100 using application routers in an application network 104 in accordance with one implementation of the present invention. System 100 includes application router network 104, application set 106, application set 108, application set 110 and users 112 accessing these various application sets over application router network 104. Each application set includes a number of different applications grouped together based on common traits, shared data/information or other types of relationships to each other. Specifically, application set 106 includes applications $app_1$ 122 through $app_x$ 124, application set 108 includes applications $app_1$ through $app_y$ 128 and application set 110 includes applications $app_1$ 130 through $app_z$ 132. For example, application set 106 may include all the enterprise applications used for a manufacturing division of a company while application set 108 includes enterprise applications used in the sales and marketing division of a company. For the same company, application set 110 may further include corporate enterprise applications concerning financial management, human resources, corporate tax and accounting, research and other corporate-wide functions. These application sets 106, 108 and 110 can be physically located in a single geographic location or distributed internationally. Alternatively, each application set 106, 108 and 110 may correspond to all the enterprise applications within different subdivisions. In this case, each application set 106, 108 and 110 may include enterprise applications for manufacturing, sales, marketing and corporate operations previously described and performed at different corresponding divisions in a company.

In either implementation above or in other configurations, it is often necessary for applications in one or more application sets to communicate across application network 104 in accordance with implementations of the present invention to other applications in other application sets. Typically, enterprise applications need to share critical information about a company or business as well as integrate different workflow requirements. For example, a manufacturing or shipping application providing just-in-time services may need to receive information gathered from purchase orders in a sales force automation application. Workflow in the manufacturing application may require payment to be made in advance before starting manufacturing and also may need to coordinate the manufacturing with another materials procurement or inventory management application located elsewhere in an enterprise. At each junction, applications need to accurately and efficiently share information and ensure certain operations are performed according to specific workflow requirements needed in each area. This complex process of exchanging data and coordinating workflow requirements is facilitated and automated in accordance with the present invention.

Application network 104 can also provides secure communications capabilities between the applications in application sets 106, 108 and 110 and users 112 operating these various applications. In this example implementation, application network 104 includes application router 112, application router 114, application router 116, application router 118 and application router 120 configured to transmit application data to each other over conventional network 122 using secure methods involving encryption, authentication and authorization of users and applications. Application level security features implemented within application routers allows access or denies access based on detailed transactional and/or application information in addition to storage partitions, file distinctions or other logical storage boundaries that may exist.

For example, a first application may be granted access to data from a second application if the data associated with the second application was previously or originally created by the first application. Of course, the first application can be granted various levels or read and/or write permissions by the second application explicitly after data in an application has been created. Application level security granularity allows application data to be securely administered based on transactions or records even if the data is under the same enterprise applications. Alternatively, if lower security is required then application routers can be configured to share all data between different applications associated with one or more application routers.

Once security is determined and processed, application data travels over conventional network 122 carried by TCP/IP, SNA, Novell Netware or any other similar network protocol capable of providing access to a layered network communication model or any other equivalent general purpose networking protocol. In practice, conventional network 122 also includes conventional routers, switches, repeaters and other networking devices familiar to those skilled in the art and used for general purpose broadband or local area networking Application routers 112, 114, 116, 118 and 120 include conventional routing technology along with application routing functionality in accordance with implementations of the present invention. Application routing operations receive application data, convert the application data into a neutral format and then route the data to the appropriate application through one or more application routers in application network 104. Further, application routers convert the neutral format data back into the proprietary application protocol when communicating data back to an application.

Figure 2A:
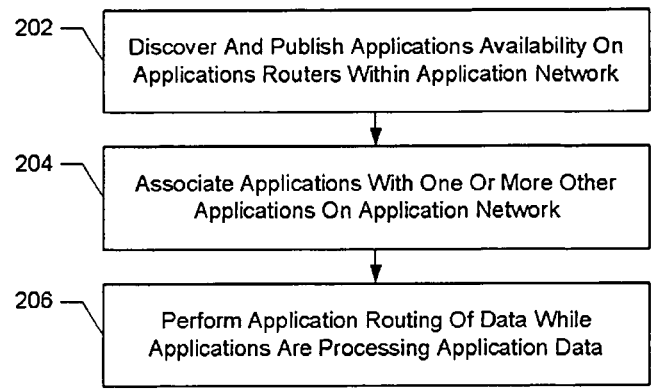
FIG. 2A is a flowchart diagram of the operations performed to integrate applications together using application routers and software in accordance with one implementation of the present invention.

FIG. 2A is a flowchart diagram of the operations performed to integrate applications together using application routers and software in accordance with implementations of the present invention. Applications initially perform discovery of other applications by publishing the application availability on the application routers within the application network (202). Applications publish application information sufficient to identify data structures used by an application to carry information, interfaces describing access methods to these data structures and protocols for transmitting/receiving information over a network. This application information is often referred to as metadata as it provides descriptive details about the information without necessarily providing the underlying substantive information. For example, substantive information may include a public-key, encrypted password or other security information used to ensure a transaction is performed securely and confidentially.

Published information facilitates associating one application in the application network with one or more other applications on the application network (204). Application routers exchange metadata and other information about different applications and then associate the different applications together. This association process maps data fields from the data structures used in a first application, the source system, with corresponding data fields from the data structures of a second application, the target system. Field type and other type processing performed in accordance with the implementations of the present invention ensures these field mappings compatible during run time. Many of the type compatibility issues deal with data formats and cardinality issues associated with groups of data. In some cases, lower level compatibility may require swapping byte order or filing data with default values to accommodate low-level formatting differences that may exist between data in the various data structures.

While most integration takes place between two different applications, it is contemplated that integrations may also occur between several different applications. Accordingly, a source system may include a set of applications to be integrated with a different set of applications associated with the target system. Alternatively, the source system may describe one application while the target system may include two or more applications. Conversely, the source system may include two or more applications while the target system includes only a single application.

Once the mapping has been assured, application routing commences between the source and target systems while processing application data (206).

Figure 2B:
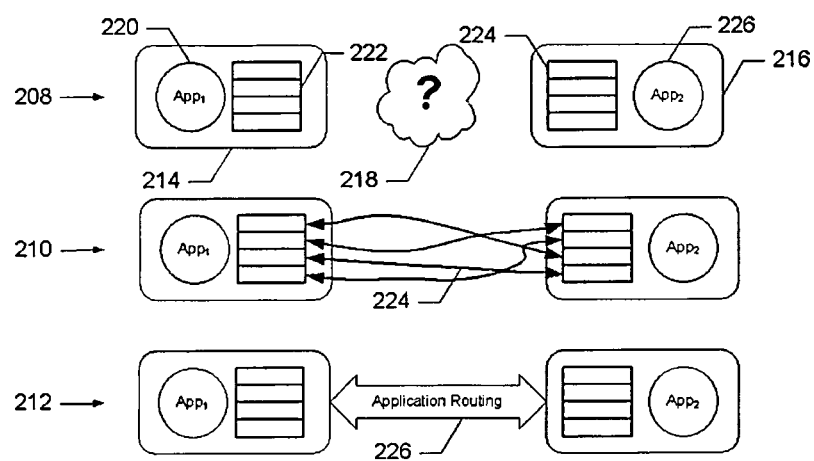
FIG. 2B is a pictorial depiction of the operations for integrating applications into the application network in accordance with one implementation of the present invention.

FIG. 2B is a pictorial depiction of these operations for integrating systems into the application network in accordance with the present invention. Systems are integrated through discovery 208, association or mapping 210 and then application routing 212. Prior to integration, $app_1$ 214 and $app_2$ 216 are placed within an application network 218 in accordance with the present invention but cannot exchange application data. During discovery 208, $app_1$ 214 and $app_2$ 216 publish their availability on application network 218. Logic 220 and application 222 from $app_1$ 214 and logic 226 along with application data 224 from $app_2$ 216 are registered and made available on the application network 218. Implementations of the present invention automatically or manually perform association 210 between $app_1$ 214 and $app_2$ 216 based upon the metadata thereby connecting application data 222 with application data 224 according to their respective logic 220 and logic 226. Mapped fields between $app_1$ 214 and $app_2$ 216 are analyzed to determine compatibility during runtime. Field type incompatibilities may be modified in response to this analysis to ensure subsequent runtime compatibility. Consequently, once these steps are complete, routing 212 performs application routing 226 allowing applications to rapidly exchange their respective pools of information.

Figure 3:
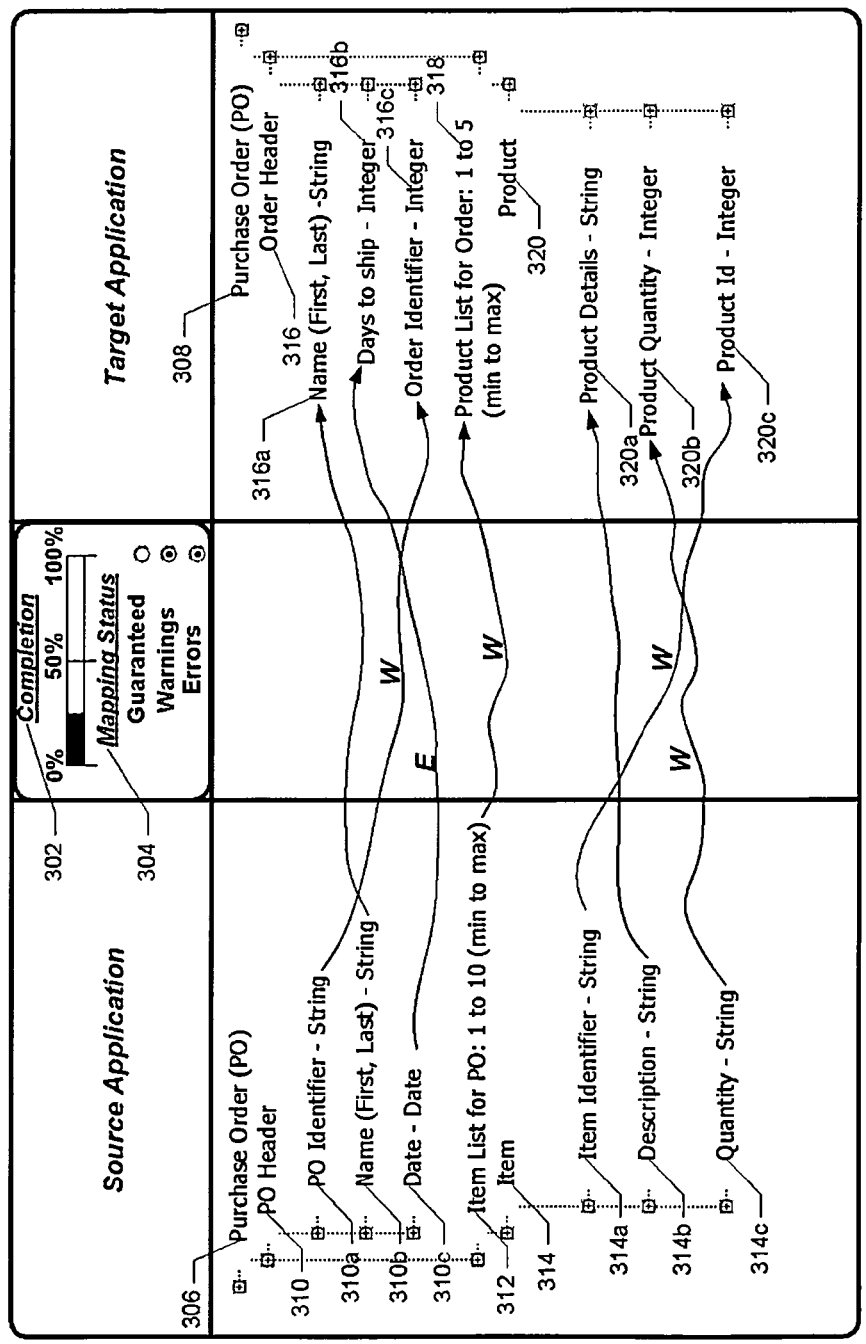
FIG. 3 illustrates a sample interface for mapping fields between a source and target application in accordance with one implementation of the present invention.

FIG. 3 illustrates a sample interface for mapping fields between a source and target system in accordance with one implementation of the present invention. In this example, mapping interface 300 provides a completion indicator 302, a mapping status indicator 304, a source application work area 306 and a target application work area 308. This particular integration project example depicts a potential mapping of a purchase order object between a source application and a target application.

The fields in source application work area 306 include a hierarchical arrangement of fields including: a purchase order (PO) header 310 to describe the overall purchase order and an item list 312 with a sequence of individual items. The PO header 310 and item list 312 can further be classified as complex types as they contain additional fields rather than directly holding data from the source application. In contrast, PO identifier 310*a*, name 310*b* and data 310*c* can be classified as primitive types as they contain substantive information from the particular application. Likewise, item identifier 314*a*, description 314*b* and quantity 314*c* are primitive types as they include substantive information about each individual item in item list 312.

Fields in target application work area 308 also include a hierarchical arrangement of fields including: order header 316 for describing details of the purchase order and product list 318 with the sequential listing of individual products and descriptive information. This example illustrates that the source application and the target application may contain similar information but define fields differently or potentially have different types associated with the fields as described below. In this part of the example, each order header 316 is a complex type containing primitive types name 316*a*, data 316*b*, and order identifier 316*c*. Product list 318 and product 320 are both complex types as they both include additional fields as illustrated. Each product 320 includes product details 320*a*, product quantity 320*b* and product id 320*c*. Of course, these are only examples provided to assist in describing aspects of the invention and many more complex or different examples can also be created other than those depicted and described in relationship to FIG. 3.

In operation, completion indicator 302 measures how many mappings in the integration project have been completed with an acceptable or guaranteed mapping compared with those not yet completed or resulting in an error. In general, the completion indicator indicates the mapping is complete when all of the required mappings have been made between the source application and target application without any errors indicated. Compared to the required mappings, optional mappings are not required to complete a mapping operation. However, any optional mapping that is attempted also need be done without error to achieve completion status for the mapping.

In one implementation, the mapping may also be considered complete according to completion indicator 302 even when some of the mappings result in a warning or guaranteed status as long as none has errors. Alternatively, completion indicator 302 can be configured to indicate completion only when all of the mappings have been made with a guaranteed status and no warnings. This latter approach would more likely result in fewer errors during runtime compared with the former approach as a result of more rigorous type checking requirements to reach completion. In either of these above or alternate approaches, completion indicator 302 can be used to disallow compilation and proceeding further if the indicator does not indicate completion status however defined.

As depicted in this example, mapping status 304 analyzes one or more mappings as specified between source application work area 306 and target application work area 308. Each mapping between primitive types in the source application is compared with the primitive type in the target application to ensure data compatibility at runtime. For example, PO identifier 310a having a string type generates a warning as it may not be compatible with its mapped counterpart order identifier 316c at runtime. This is because not all possible string types contain data compatible with an integer type.

A cardinality based warning is another different type of warning generated between item list 312 and product list 318. This type of warning indicates a mismatch between the potential number of enumerated items in the target application compared with the source application. In this example, item list 312 in source application indicates a possibility of up to 10 different items yet the product list 318 only has allocated storage for up to 5 items and thus may result in an error at runtime depending on the exact number of items being transacted. Many other types of potential mismatches between the numbers of items or types of items could be the basis of different cardinality type warnings.

Errors indicated in mapping status 304 results when the type analysis shows no possible overlap of acceptable values in the field of a source application compared with the field of a target application. In this example, date 310c from the source application generates an error when mapped to date 316b of the target application as it is not possible for a date type field to fit into an integer field without performing converting or manipulating the data. Similarly, item identifier 314a containing a string type in the source application also generates an error when mapped to product id 320c of the target application as it has an integer type.

As a result of the above processing, mapping status 304 can be configured to stop further processing as errors due to cardinality, type or other mismatch are likely to have negative effect on subsequent runtime processing. Alternatively, one or more warnings as indicated by mapping status 304 can be configured to allow further processing as it is not certain that a mismatch will occur during runtime and whether it could cause a runtime error. Of course, a guaranteed status from mapping status 304 indicates no warnings or errors and processing continues from the mapping to other operations needed in the overall integration project.

Figure 4:
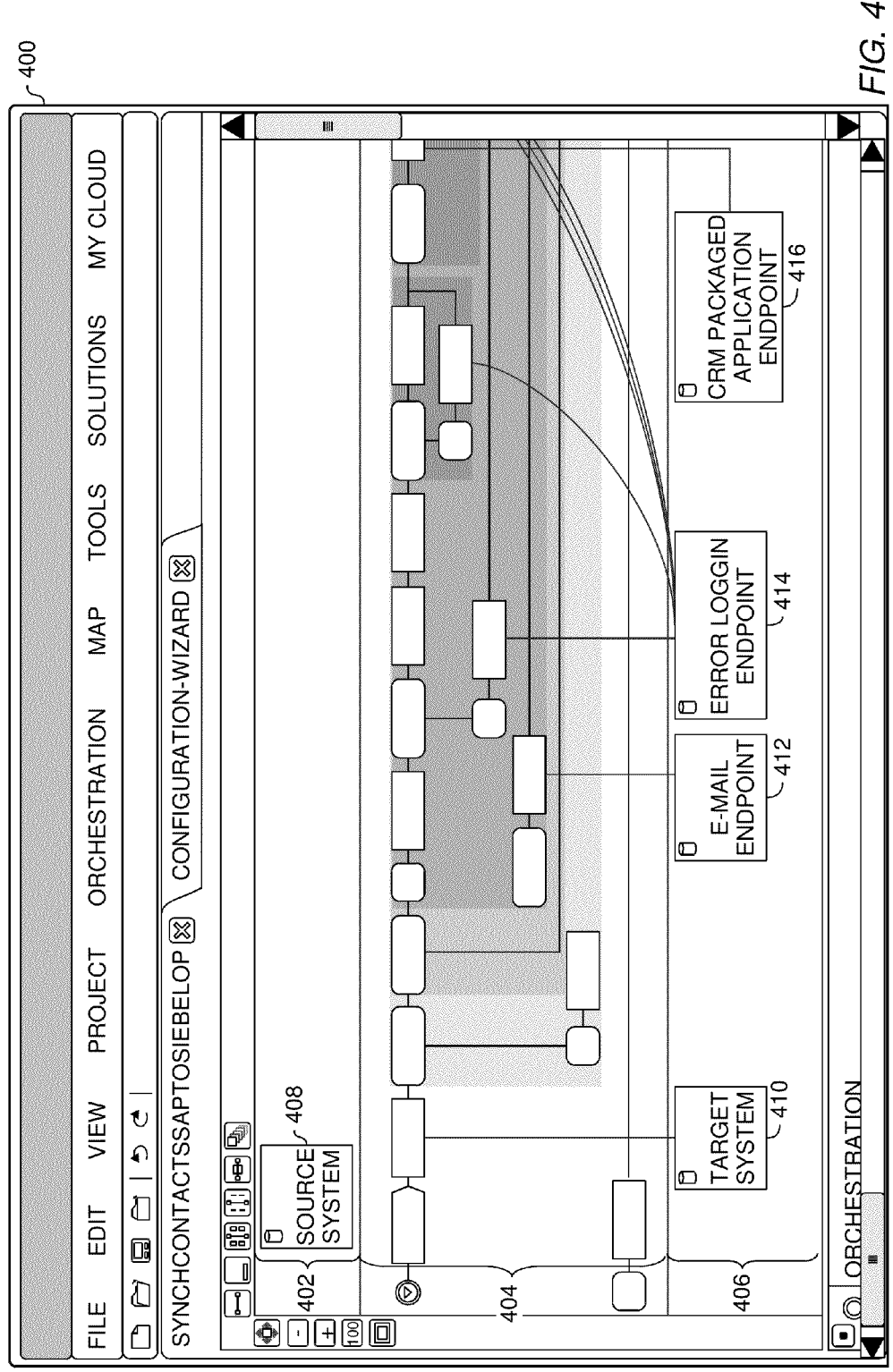
FIG. 4 is an interface diagram of a complete workflow between a source system and a target system in accordance with one implementation of the present invention.

FIG. 4 is an interface diagram of a complete workflow between a source system and a target system. Interface 400 in this particular implementation represents the complete workflow in several sections: source end points 402, activities 404 and target endpoints 406. Alternate organizations of the complete workflow in interface 400 are also contemplated and may depend on the particular level of detail to be presented. For example, individual operations associated with each of the activities 404 may also be displayed providing further details in interface 400.

In this example, source endpoints 402 may include a source system 408 as well as other subsystems associated with the integration and related to the one or more source applications identified by source system 408. For example, source endpoints 402 may in fact only include one source application such as an SAP® packaged application to be integrated with a target application. Indeed, the implementation of interface 400 depicted in FIG. 4 identifies one source application 408 however it is contemplated source end points 402 might include more than one source application as well as other source application related subsystems.

Each activity 404 in interface 400 represents a grouping of one or more operations that facilitate the complete workflow and integration between the source and target systems. For example, one activity may include SQL database operations for processing data from one or more objects from a source system, a target system or both the source system and target system. Other activities may perform logical operations that regulate the logical flow of data through the work flow. These activities with logical operations may include conditional branching logic such as "If then else" constructs keyed on data obtained from source or target objects.

Yet other types of activities may invoke functionality made available from endpoints external to both the source and target systems yet part of the computing platform or operating system. For example, these latter activities may invoke sending emails through a separate email application running independent of the source or target applications. Error logging is yet another function external to the source and target systems yet included in activities 404. Often error tracking and logging are provided as a service in an underlying operating system or computer system.

In the implementation illustrated in FIG. 4, target endpoints 406 include a target system 410 having a single target application and several different external endpoints 412, 414, and 416. For example, these external endpoints could include an email endpoint 412, an error logging endpoint 414 and a Siebel® CRM packaged application endpoint 416. In any case, endpoints often require some credentials to operate and may produce different information or results depending on the credentials provided to the system.

Figure 5:
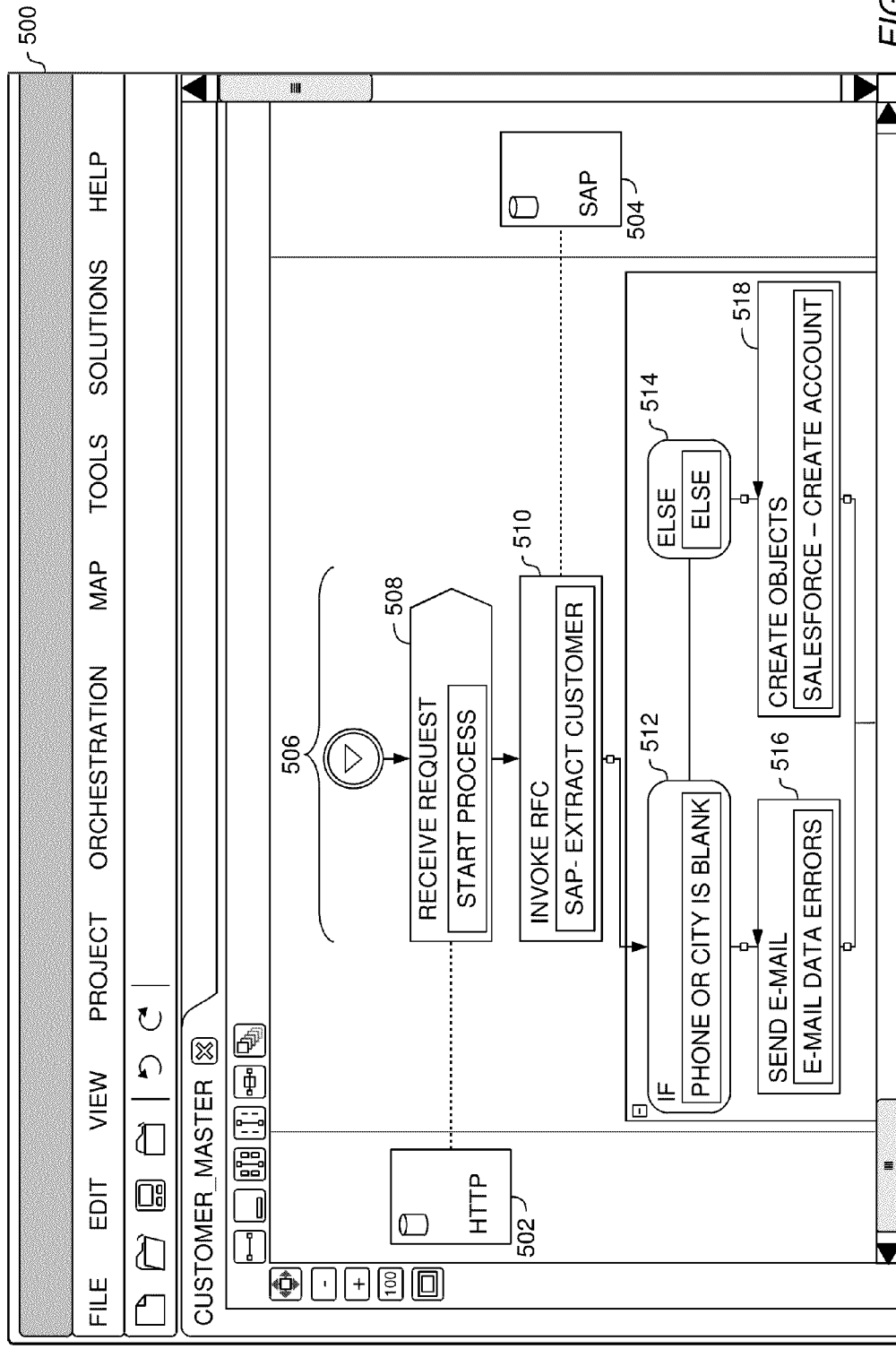
FIG. 5 illustrates an interface displaying an integration and workflow between a single source application for the source system and a single target application for the target system in accordance with one implementation of the present invention.

Given the complexity of the complete workflow in FIG. 4, it is useful to highlight and identify just a few activities that might be found in a smaller complete workflow design. Referring to FIG. 5, interface 500 displays an integration and workflow having a single source application 502 (i.e., an HTTP based application like Salesforce®) for the source system and a single target application 504 (i.e., SAP® packaged application) for the target system. Activities 506 in this example complete workflow provide the operations involved in the integration between source application 502 and target application 504. In particular activities 506 include a receive request/start process activity 508, extract customer activity from target application 510 and conditional logic to determine if the "Phone" or "City" fields are blank and a send email activity 516 to send an email notification of the missing fields. Alternatively, if the "Phone" or "City" fields are not blank then the create objects activity 518 creates an account in the target application—the Salesforce® packaged application.

Figure 6:
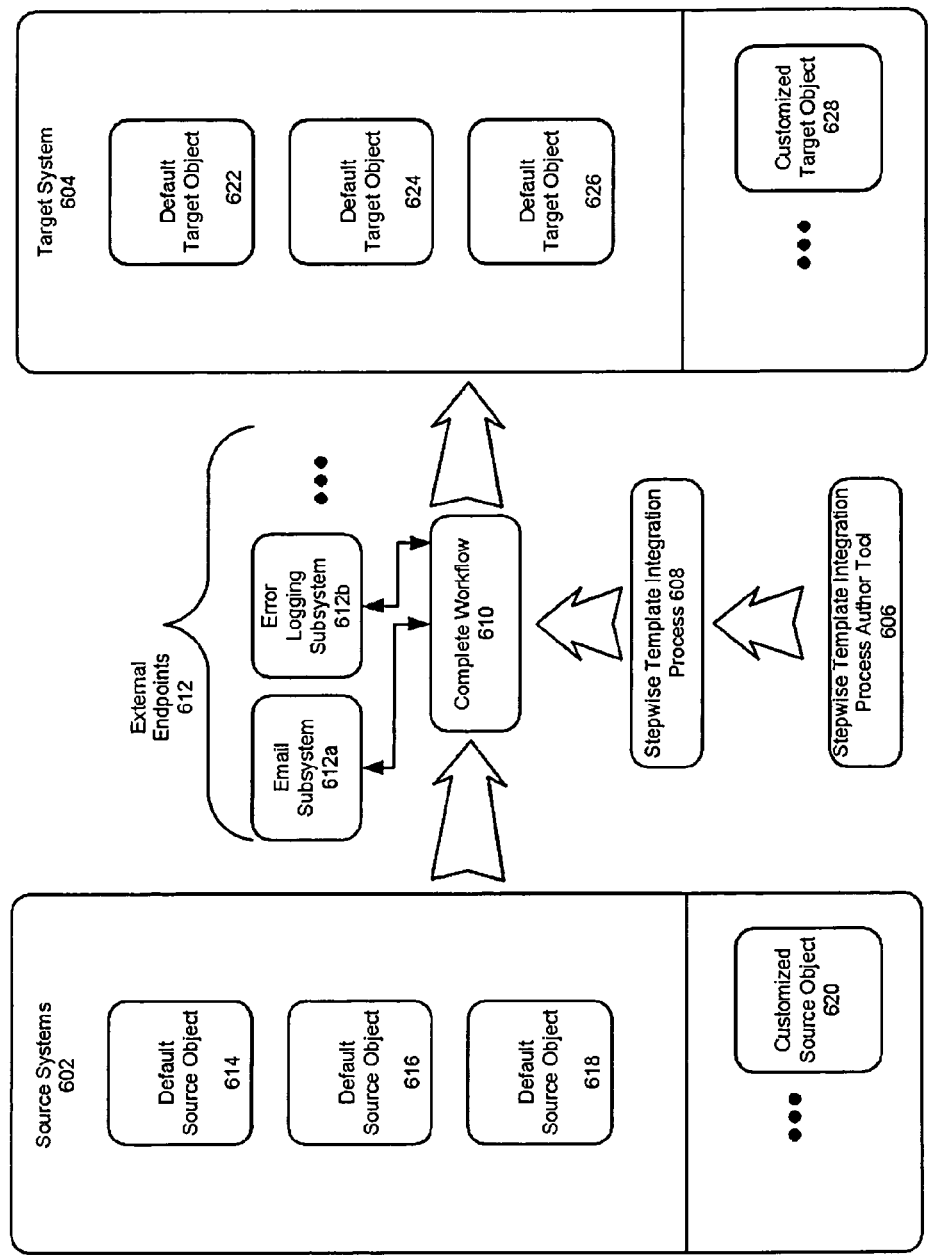
FIG. 6 provides a schematic overview of streamlining the complete workflow with a stepwise template integration process in accordance with aspects of the present invention.

FIG. 6 provides a schematic overview of streamlining the complete workflow with a stepwise template integration process in accordance with aspects of the present invention. In this schematic, a complete workflow 608 was initially created as an integration process mapping fields from default objects in source system 602 with default objects from target system 604. As previously described, source system 602 may include one or more source applications and target system 604 may also include one or more target applications.

Complete workflow 610 may occasionally include activities that interface with external endpoints 612 associated with a computer or operating system and not necessarily with either source system 602 or target system 604. For example, external endpoints 612 may include an email subsystem 612a for sending emailing notifications, an error logging subsystems 612b or other external endpoints.

Enterprises frequently modify the initially provided default objects from a source or target system and create one or more customized objects tailored to their business. For example, packaged applications developed by companies such as SAP®, Salesforce® and Oracle® Corporation can be purchased with default objects and then customized to meet the particular needs of the enterprise. In the context of an integration process, various packaged applications and their customized objects may be found within either source system 602 as customized source objects 620 or target system 604 as customized target objects 628.

By default, the initially provided complete workflow 610 maps between default source objects from source system 602 and default target objects from target system 604 as any customized objects may differ for each installation and cannot be predetermined. The completed workflow 610 by default leaves it up to a user to identify and map between the customized objects. Accordingly, one aspect of the present invention quickly identifies these customized objects and provides a framework for a user to ensure that a proper mapping and integration is performed.

In one implementation, a stepwise template integration process author tool 606 generates operations to sift through objects on source system 602 distinguishing between default source objects such as default source object 614, 616 and 618 and one or more customized source objects 620. Tool 606 may also create operations that analyze activities and other elements in complete workflow 610 to find other candidates for inclusion in the stepwise template integration process 608. As a result, the stepwise process integration author tool 606 may suggest a set of objects, customized objects and related activities/operations for an author to consider when finalizing creation of the stepwise template integration process 608 in accordance with aspects of the present invention. Similarly, aspects of the present invention help the author expedite creation of the stepwise template integration process 608 by disregarding areas of the complete workflow 610 not likely to need modification.

Eventually, stepwise template integration process author tool 606 designed in accordance with aspects of the present invention creates the stepwise template integration process 608 for a user. The author starts using tool 606 to assist in selecting a limited subset of operations from the complete workflow 610 for inclusion in stepwise template integration process 608. Once completed, the stepwise template integration process 608 is made available in a template repository for users to select from when performing the actual integration between source system 602 and target system 604. Customized objects and related activities may be highlighted to help the user of the stepwise template integration process 608 recognize the activities and operations requiring attention.

Instead of directly modifying complete workflow 610, a user executes stepwise template integration process 608 and is guided through only a limited number of steps to complete the integration. As will be described in further detail later herein, aspects of the present invention give the user a definitive starting/ending point and sequence of steps thereby greatly simplifying the integration process. Guiding the user in this manner not only makes it easier to complete the integration process but also to finish the integration process with fewer errors.

Figure 7:
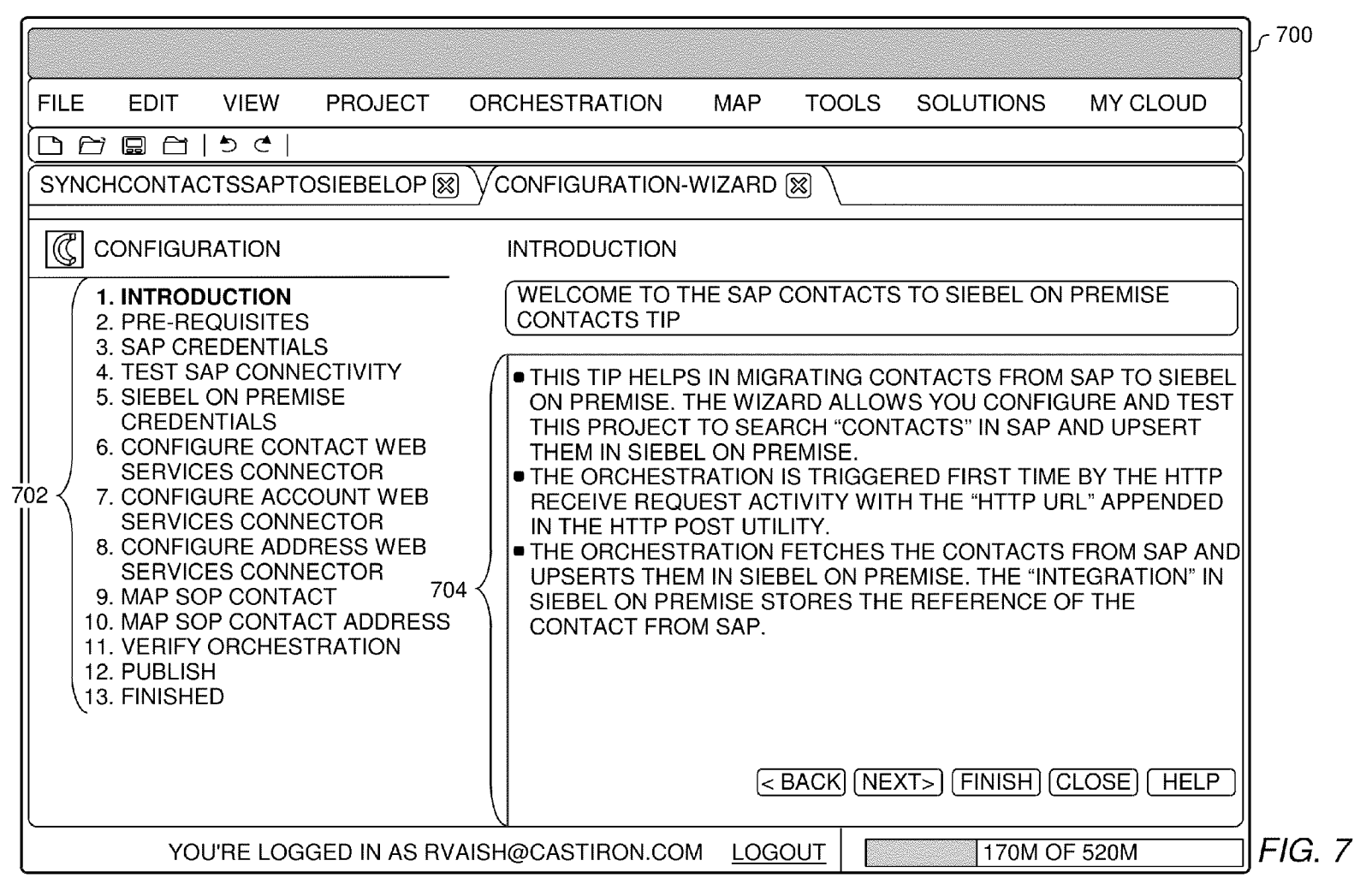

FIG. 7 illustrates the interface of a stepwise template integration process in accordance with one implementations of the present invention. Notably, interface 700 in this example includes a limited subset of operations 702 arranged in a stepwise organization. As previously described the limited subset of operations 702 are identified and arranged in the stepwise sequence as illustrated using the stepwise integration process author tool. In this example, the stepwise sequence begins with step 1 "Introduction" and ends with Step 13, "Finished". The author of each step may optionally include data in ancillary data field 704 describing the purpose of the step or may include interactive fields for the user to enter further information as needed. For example, interactive field in ancillary data field 704 may help guide the user map a source object and target object or otherwise complete some other aspect of the integration. In FIG. 7, the author specifies in ancillary data 704 that the stepwise template integration process concerns "migrating Contacts from SAP to Siebel On Premise".

Figure 8A:
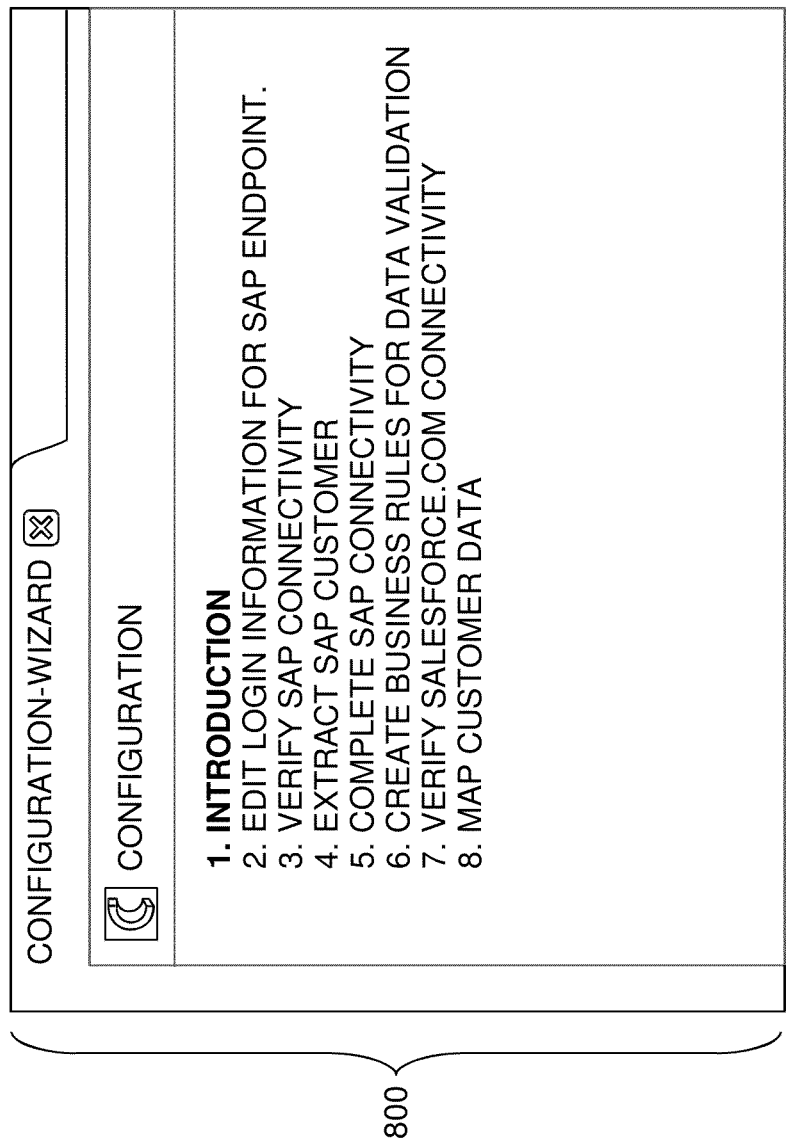

In another example, FIG. 8 illustrates a different stepwise template integration process in accordance with the present invention. Stepwise template integration process 800 in this example includes a total of only 8 steps starting with "1. Introduction" and ending with "8. Map customer data". Interface 802 shows stepwise template integration process 800 sometime later after the user has completed "1. Introduction" and getting ready to complete step 2 identified as, "2. Edit Login Information For SAP Endpoint". As illustrated, ancillary data field 806 in this case includes detailed information on the user's credentials for logging into an SAP® packaged application or other endpoint. Ancillary data field 806 in this example is useful as it allows a user to see default values and make changes as needed—such as changing a default password, login name, Hostname (i.e., SAPHost), User Name (i.e., cisi), System Identifier (i.e., SAPSystem), or Source/Target System Password (i.e., SAPpw).

Figure 9:
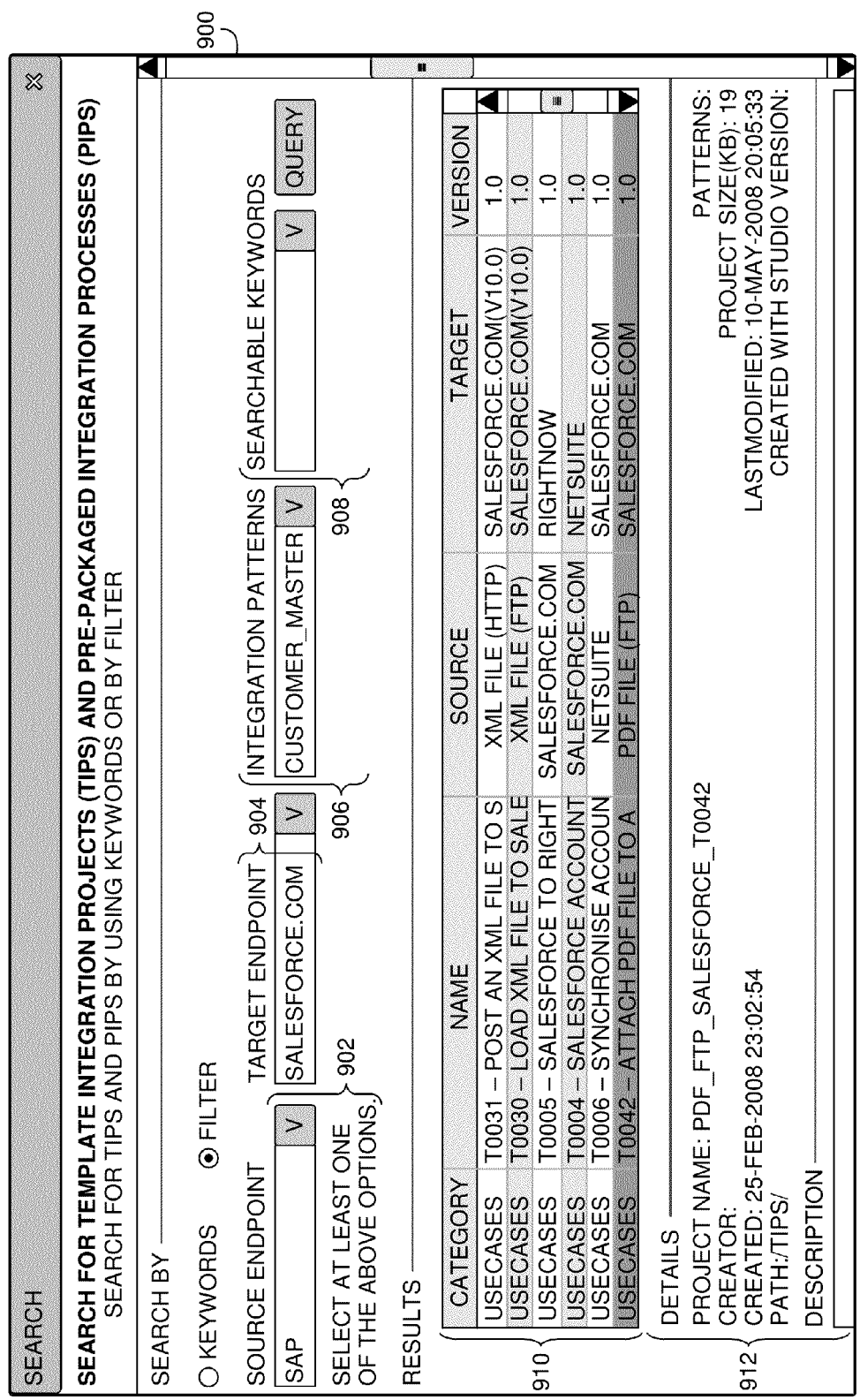
FIG. 9 illustrates another interface section in accordance with aspects of the present invention for searching through a template repository and method for delivering the same to a user.

FIG. 9 illustrates another interface section in accordance with aspects of the present invention for searching through a template repository and method for delivering the same to a user. To find available stepwise template integration processes in this implementation, a user may enter search criteria in template repository interface 900 specifying a source endpoint 902, a target endpoint 904, one or more integration patterns 906 and/or searchable keywords 908. Integration patterns 906 generally allow the user to indicate the nature of the integration process, for example: Customer Master, Sales Order, or Quote to Cash. If the integration process requested is available then one or more stepwise integration processes 910 fitting the search criteria may be displayed. When no integration process meets the criteria then either an author to create a new integration process for the user or the user needs to modify the search criteria to find a suitable available stepwise template integration process.

A user can read template details 912 associated with the stepwise template integration processes to determine if the available template will actually satisfy the integration requirements between the source endpoint and target endpoint. Template repository interface 900 may provide a user a method of downloading the requested template or otherwise making the selected template available to the user. For example, the template repository interface 900 may make the stepwise template integration process available to the user on in a software as a service (SaaS) or Cloud-computing environment that stores the user's preferences, profile and activities.

Figure 10:
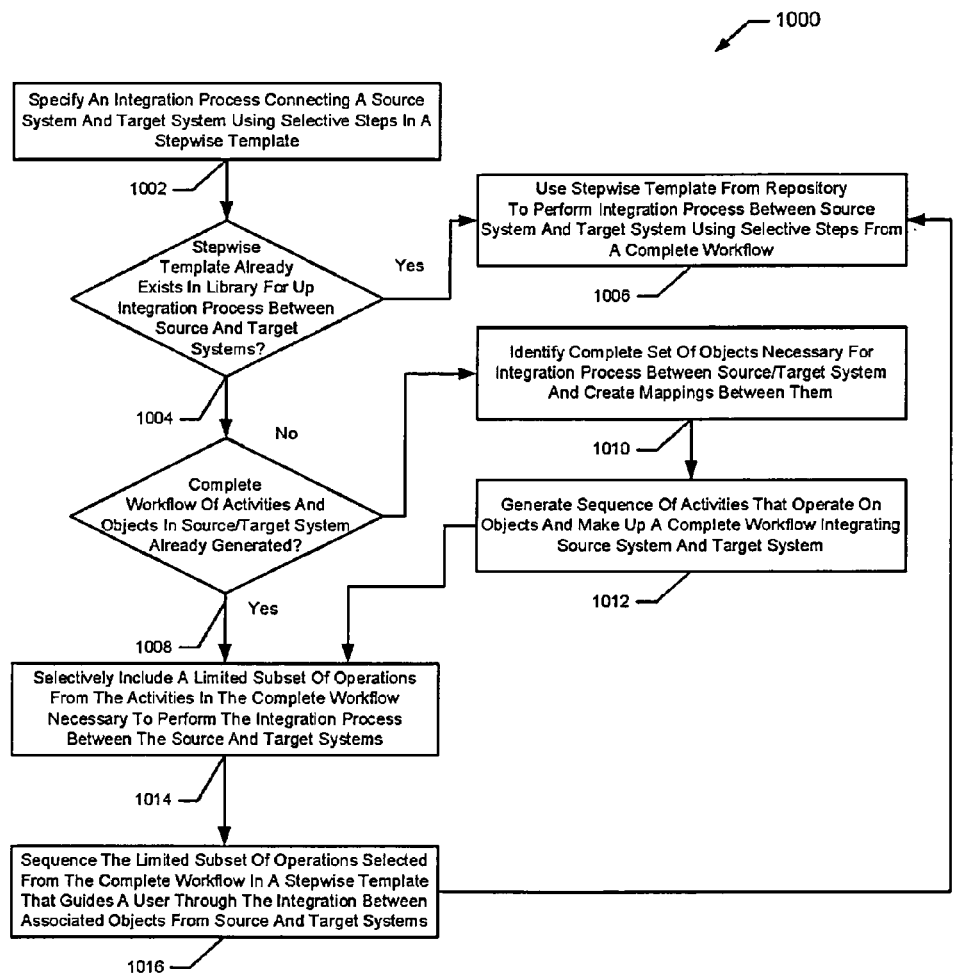
FIG. 10 is a flowchart diagram that provides a set of operations associated with authoring a stepwise template integration process in accordance with aspects of the present invention.

Referring now to FIG. 10, a flowchart diagram provides a set of operations associated with authoring a stepwise template integration process in accordance with aspects of the present invention. Generally, an author uses an authoring tool in accordance with the present invention to create an initial stepwise template integration process for the user. The user follows the sequence of steps in the stepwise template integration process to then finalize the template and then perform the integration. In some cases, the authoring tool may perform some of the operations directly when creating the stepwise template integration process. However, if the operations depend on a user's credentials or login then the authoring tool creates instructions for the stepwise template integration to perform these operations once the user has provided the credentials.

In the flowchart in FIG. 10, a set of requirements generally specifies an integration process connecting a source system and target system (1002). For example, a user may need to perform a particular integration between a source and target system. The user will then request a stepwise template integration process designed in accordance with the present invention to save time when integrating a given source and target system.

Next, aspects of the present invention will determine if a stepwise template already exists in a template repository or library for the requested integration process between the source and target systems (1002). This step may result in significant time and cost savings if the requested integration had already been requested or performed and a corresponding template authored. Accordingly, if the template is available then aspects of the present invention will reuse the stepwise template from the repository. The reused template would then perform the integration process between source system and target system using selective steps from a complete workflow (1006).

Alternatively, aspects of the present invention may instead need to generate the stepwise template for the first time. If this is the case, aspects of the present invention must first determine if a complete workflow of activities and mappings between objects in the source and target system have been generated (1008). The complete workflow is a prerequisite as the limited subset of operations making up the stepwise template are derived from activities in the complete workflow. To create a new complete workflow, an author uses the authoring tool to identify a complete set of objects necessary for the integration between the source system and target system and then creates mappings between them (1010). Next, the author generates the complete workflow using a sequence of activities operating on objects and endpoints to achieve the desired integration between source system and target system (1012).

When the complete workflow already exists, the stepwise template integration process may be created directly (1008). The first step selectively includes a limited subset of operations from the activities in the complete workflow (1014). As previously mentioned, aspects of the present invention may automatically identify a set of activities and objects for the author to include in the stepwise template integration process. For example, activities interacting with a source application may be nominated as candidates for inclusion in the stepwise template integration process. Next, aspects of the present invention sequence the limited subset of operations selected from the complete workflow. The authoring tool places the sequence of operations in a stepwise template to guide a user through the integration between associated objects from source systems and target systems (1016).

Figure 11:
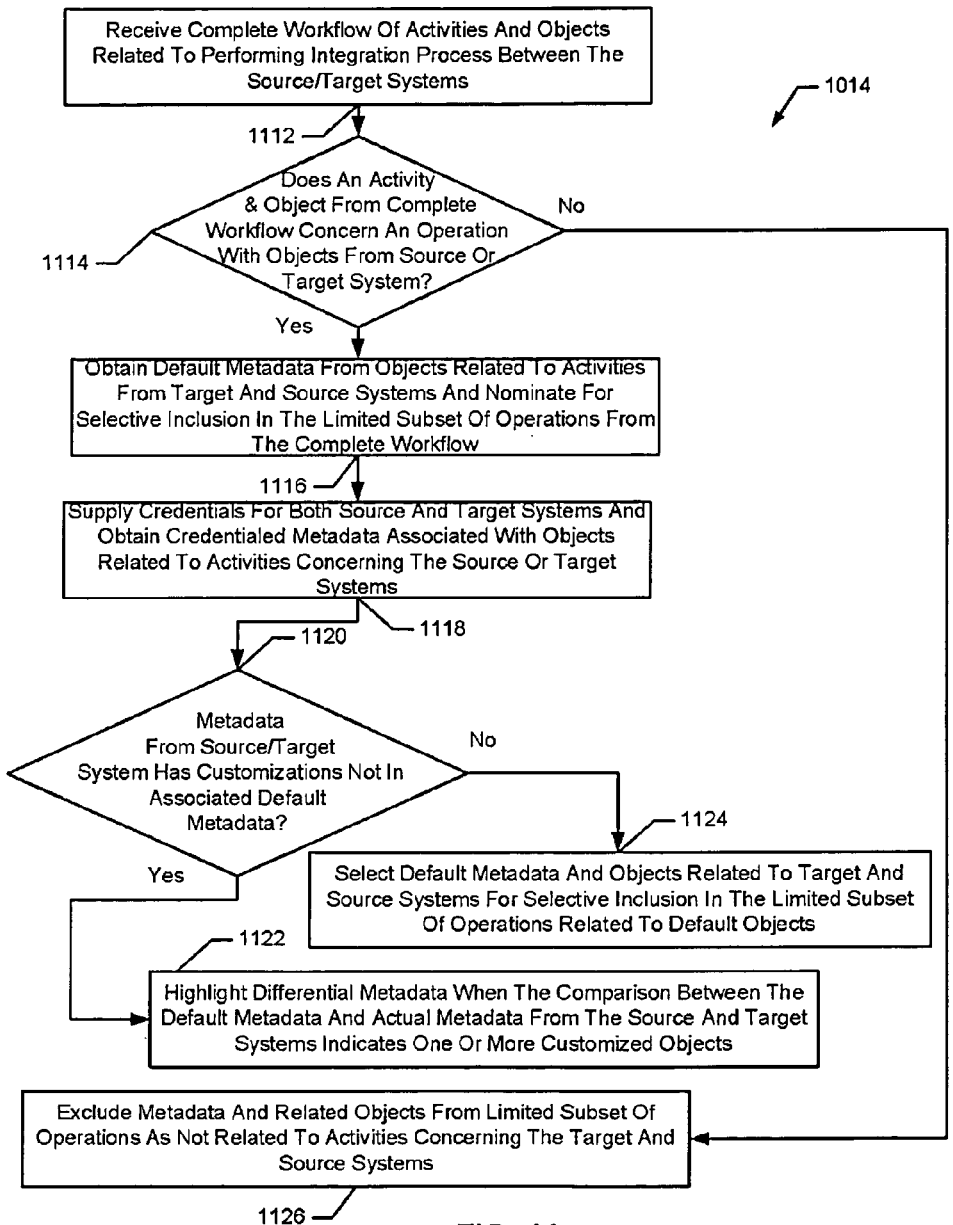
FIG. 11 is a flowchart diagram of the operations used when nominating a set of activities and objects for an author to include in a stepwise template integration process.

FIG. 11 is a flowchart diagram of the operations used when nominating a set of activities and objects for the author to include in the stepwise template integration process. In one implementation, the analysis considers the complete workflow of activities and objects related to performing integration process between the source systems and target systems (1112). Aspects of the present invention determine whether activities and objects from the complete workflow concern an operation upon objects from either the source system or target system (1114). For example, an object included in this determination may be an accounting object associated with a source application within the source system. Generally, objects or activities are not considered candidates when the activity concerns an external endpoint or is not related to a source or target system. For example, an activity that sends an email reporting status or an error would not be considered a candidate for the integration. If this occurs then aspects of the present invention do not nominate the activities and related objects for the limited subset of operations in a stepwise template (1126).

Alternatively, aspects of the present invention nominate activities and related objects from the complete workflow for possible inclusion in the stepwise template integration process. One authoring tool implementation of the present invention creates operations in the stepwise template integration process that obtain default metadata from these nominated objects to aid in identifying customized objects (1116). Default metadata represents the unmodified data structures initially provided with a given packaged application such as developed by SAP®, Salesforce® or Oracle®. It should be understood that the authoring tool designed in accordance with the present invention creates operations that nominates these objects and activities however their ultimate inclusion in the stepwise template integration process is decided by the author. Nonetheless, identifying candidates helps save a great deal of time and energy as it expedites the decision to include or exclude objects and operations from the template.

Aspects of the present invention supply credentials for both source and target systems and obtain credentialed metadata for objects related to activities on the source or target systems (1118). Credentials may provide access to each system, access to objects on the source or target system and other credentialed areas. Each credential may be associated with different customized objects and corresponding metadata on the same source or target system. For at least this reason, obtaining the credentials and customized metadata is an important step in completing the integration and generally performed by the stepwise template integration process.

Next, aspects of the present invention use metadata to determine if source system and target system have corresponding customizations. One implementation compares metadata obtained from the source and target system with corresponding default metadata associated with source and target systems (1120). If the default metadata is not identical to the metadata obtained from the actual source and target systems then the corresponding objects have been customized and need extra attention. Accordingly, one implementation highlights the differential metadata when comparing the default metadata with the actual metadata from the source and target systems. The differences in the metadata indicate that the source or target systems have one or more customized objects (1122). Aspects of the present invention may highlight the customized objects, related activities and operations in a predetermined color such as red, blue or other contrasting color to identify them to a user. Even if the objects are not deemed customized, aspects of the present invention will still select the default metadata and objects related to target and source systems for selective inclusion in the limited subset of operations (1124).

Figure 12:
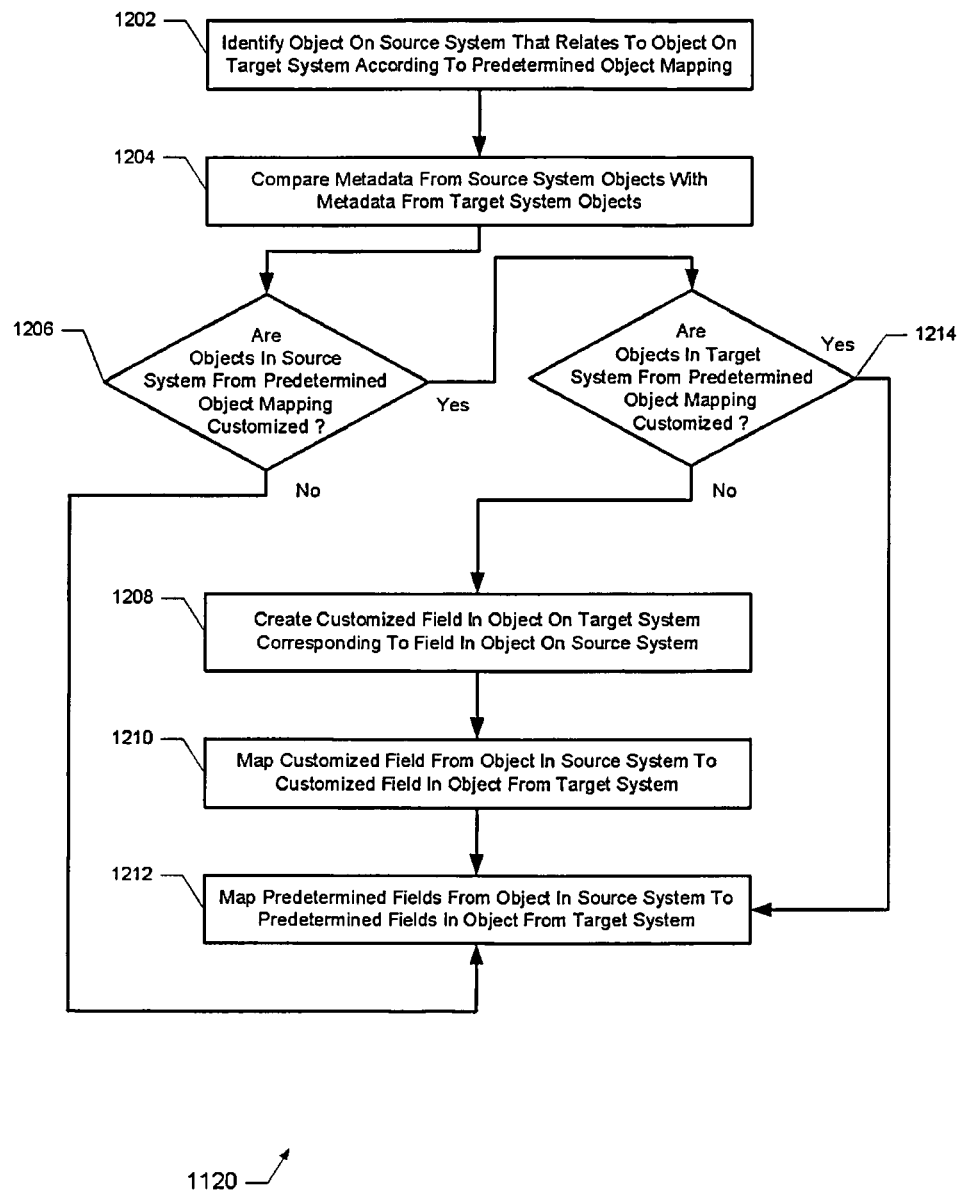
FIG. 12 is a flowchart diagram of the operations to further assist in customizing the stepwise template integration process that integrates between a source and target system.

FIG. 12 is a flowchart diagram of the operations to further assist in customizing the stepwise template integration process that integrates between a source and target system. Initially, an authoring tool designed in accordance with the present invention identifies objects on the source system and related objects on the target system according to a predetermined object mapping (1202). To obtain the metadata, operations in the stepwise template integration process provide credentials to both the source and target systems to determine if any objects within the packaged applications on either system have been customized. The stepwise template integration process then performs one or more comparisons of the metadata from the source system objects with metadata from the target system objects (1204).

In one implementation, aspects of the invention determine if objects from the predetermined object mapping in source system are customized (1206). This may be done by comparing metadata from the actual source system with default metadata in an unmodified source system. For example, differences between metadata in the actual source system and the corresponding default metadata may indicate that one or more objects have been customized. If the customized objects in source system are also in a customized target system (1214) then the aspects of the present invention proceed directly to ensure source objects in source system are mapped to target objects in target systems in accordance with the predetermined object mapping (1212). The authoring tool then nominates these objects for the author to consider including in the stepwise template integration process being generated.

However, if the customized objects in source system are not in target system (1214) then the authoring tool creates one or more customized fields in the objects of the target system such that they correspond to the customized fields of the objects on the source system (1208). In addition, the authoring tool designed in accordance with the present invention may also map these customized fields from the objects in the source system to the customized fields in the objects of target system (1210). Once again, the authoring tool ensures the source objects in source system are mapped to target objects in target systems in accordance with the predetermined object mapping (1212) and then nominates these objects for the author to consider for inclusion in the stepwise template being generated.

Figure 13:
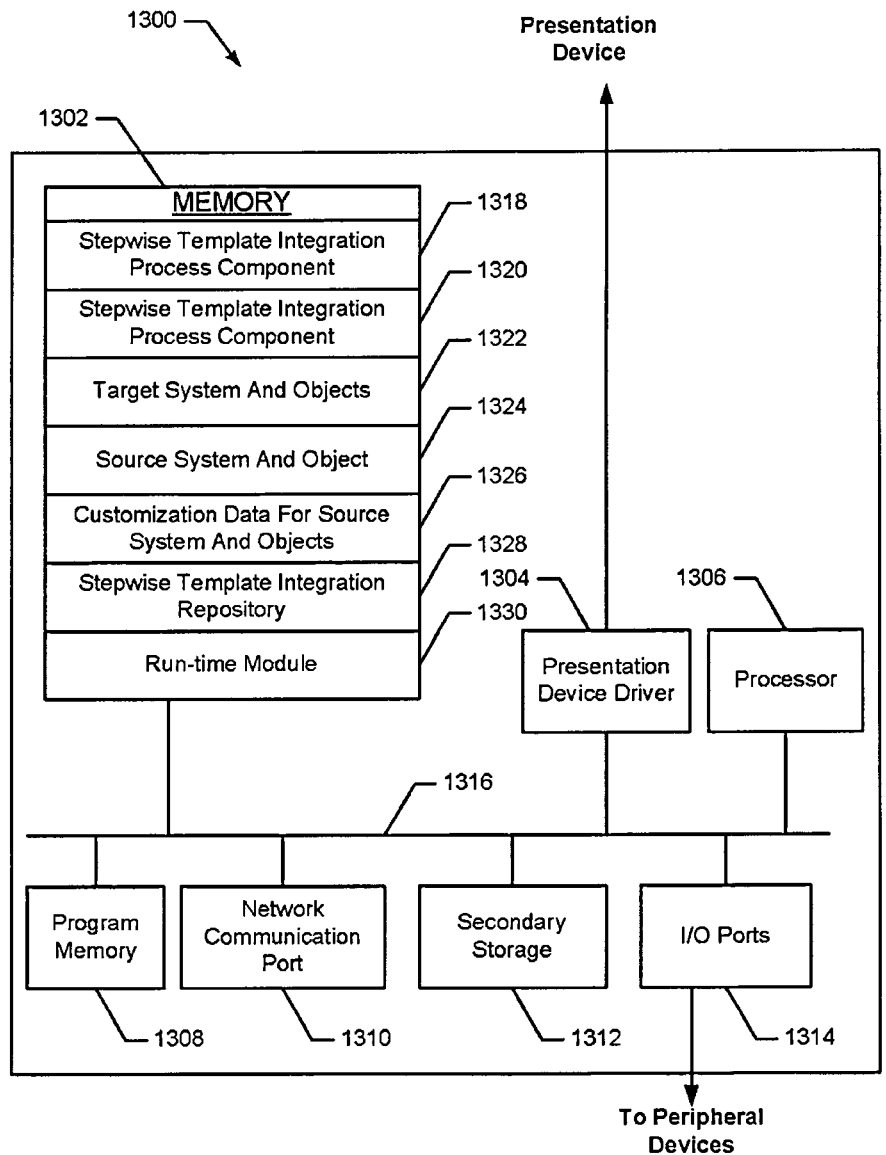
FIG. 13 is a block diagram of a system used in one implementation for performing the apparatus or methods of the present invention.

FIG. 13 is a block diagram of a system 1300 used in one implementation for performing the apparatus or methods of the present invention. System 1300 includes a memory 1302 to hold executing programs (typically random access memory (RAM) or writable read-only memory (ROM) such as a flash ROM), a presentation device driver 1304 capable of interfacing and driving a display or output device, a program memory 1308 for holding drivers or other frequently used programs, a network communication port 1310 for data communication, a secondary storage 1312 with secondary storage controller, and input/output (I/O) ports 1314 also with I/O controller operatively coupled together over an interconnect 1316. In addition to implementing the present invention using a conventional personal computer or server, system 1300 can be preprogrammed, for example, using field-programmable gate array (FPGA) technology, ROM or it can be programmed (and reprogrammed) by loading a program from another source (for example, from a floppy disk, a CD-ROM, or another computer). Also, system 1300 can be implemented using customized application specific integrated circuits (ASICs).

In one implementation, processor executes instructions in memory 302 selected from one or more components including a stepwise template integration process component 1318, a stepwise template integration process authoring tool component 1320, a target system and objects 1322, a source system and objects 1324, default metadata for source and target objects 1326, a stepwise template integration process repository 1328 and a run-time module 1330 that manages system resources used when processing one or more of the above components on system 1300.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. Alternatively, aspects of the invention may delivered as a service over the Internet, in a software as a service environment or SaaS. Aspects of the present invention need not be running locally on a users computer as it may be delivered for execution either wholly or partially in cloud-based environments. Fundamentally a cloud computing solution provides compute capacity, memory and storage as a service instead of requiring the user to provide physical servers or computers to execute on.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read only memory and/or a random access memory. Generally, a computer will include one or more mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A method of creating an integration process between a source system executable on a computer system and a target system executable on a computer system, comprising:
providing a complete workflow as a part of the integration process, the complete workflow having a sequence of activities that specify operations on one or more source objects and one or more target objects with the respective source system and target system and wherein the complete workflow further includes activities and associated operations that do not directly interact with the one or more source objects and the one or more target objects;
selectively including, in the integration process, a limited subset of operations from the sequence of activities in the complete workflow that interact with the one or more source objects and one or more target objects, wherein the limited subset of operations from the complete workflow excludes operations and objects that generally do not need modification when performing the integration process; and
sequencing the limited subset of operations selected from the complete workflow in a stepwise template that streamlines the integration process between the source system and target system by focusing on mappings between and operations performed upon source objects and target objects associated with the limited subset of operations selected from the operations in the complete workflow.

2. The method of claim 1 further comprising:
determining whether a stepwise template integration process connecting the source system and the target system using selective steps from a complete workflow integration is already available in a repository of stepwise template integration processes; and
reusing the stepwise template integration process from the repository of stepwise template integration processes that streamlines the integration process between source systems and target systems.

3. The method of claim 1 wherein selectively including a limited subset of operations from the complete workflow depends on whether the limited set of operations interact with one or more customized source objects or one or more customized target objects from the respective source system or target system.

4. The method of claim 1 wherein selectively including a limited subset of operations from the complete workflow depends on whether the limited subset of operations interact with one or more source objects and one or more target objects.

5. The method of claim 1 wherein the limited subset of operations from the complete workflow excludes operations that interact with subsystems on the source system and target system that do not affect source objects and target objects.

6. A system for creating an integration process between a source system and a target system, comprising:
a processor configured to execute instructions;
a memory containing the instructions which, when executed on the processor:
provide a complete workflow having a sequence of activities that specify operations on one or more source objects and one or more target objects with the respective source system and target system and wherein the complete workflow further includes activities and associated operations that do not directly interact with the one or more source objects and the one or more target objects,
selectively include, in the integration process, a limited subset of operations from the sequence of activities in the complete workflow that interact with the one or more source objects and the one or more target objects, wherein the limited subset of operations from the complete workflow excludes operations that interact with subsystems on the source system and target system that do not affect source objects and target objects; and
sequence the limited subset of operations selected from the complete workflow in a stepwise template that streamlines the integration process between the source system and target system by focusing on mappings between and operations performed upon source objects and target objects associated with the limited subset of operations selected from the operations in the complete workflow.

7. The system of claim 6 further comprising instructions when executed,
determine whether a stepwise template integration process connecting the source system and the target system using selective steps from a complete workflow integration is already available in a repository of stepwise template integration processes, and
reuse the stepwise template integration process from the repository of stepwise template integration processes that streamlines the integration process between source systems and target systems.

8. A computer program product for creating an integration process between a source system and a target system, tangibly stored on a computer-readable medium, comprising instructions operable to cause a programmable processor to:
provide a complete workflow having a sequence of activities that specify operations on one or more source objects and one or more target objects with the respective source system and target system;
selectively include, in the integration process, a limited subset of operations from the sequence of activities in the complete workflow that interact with the one or more source objects and one or more target objects wherein the complete workflow further includes activities and associated operations that do not directly interact with the one or more source objects and the one or more target objects, wherein the limited subset of operations from the complete workflow excludes operations and objects that generally do not need modification when performing an integration process; and
sequence the limited subset of operations selected from the complete workflow in a stepwise template that streamlines the integration process between the source system and target system by focusing on mappings between and operations performed upon source objects and target objects associated with the limited subset of operations selected from the operations in the complete workflow.

9. The computer program product of claim 8 further comprising instructions operable to cause a programmable processor to:
determine whether a stepwise template integration process connecting a source system and target system using selective steps from a complete workflow integration is not already available in a repository of stepwise template integration processes, and
reuse a stepwise template integration process from the repository of stepwise template integration processes that streamlines the integration process between source systems and target systems.

10. The computer program product of claim of claim 8 wherein instructions that selectively include a limited subset of operations from the complete workflow depends on whether the limited set of operations interact with one or more customized source object or one or more customized target objects from the respective source system or target system.

11. The computer program product of claim 8 wherein the instructions that selectively include a limited subset of operations from the complete workflow depends on whether the limited subset of operations interact with the one or more source objects and the one or more target objects.

12. The computer program product of claim of claim 8 wherein the limited subset of operations from the complete workflow excludes operations that interact with subsystems on the source system and target system and do not affect source objects and target objects.

13. A method of creating an integration process between a source system executable on a computer system and a target system executable on a computer system, comprising:
   creating a mapping between one or more source objects and one or more target objects as part of an integration process between a respective source system and target system;
   generating a complete workflow as a further part of the integration process, the complete workflow having a sequence of activities that specify operations on the one or more source objects and the one or more target objects with the respective source system and target system;
   selectively including, in the integration process, a limited subset of operations from the sequence of activities in the complete workflow wherein the limited subset of operations from the complete workflow excludes operations and objects that generally do not need modification when performing an integration process, wherein the limited subset of operations from the complete workflow excludes operations and objects that generally do not need modification when performing an integration process; and
   sequencing the limited subset of operations selected from the complete workflow in a stepwise template that streamlines the integration process between the source system and target system by focusing on the mappings between, and operations performed upon, source objects and target objects associated with the limited subset of operations selected from the operations in the complete workflow.

14. The method of claim 13 wherein the complete workflow further includes activities and associated operations that do not directly interact with one or more source objects and one or more target objects.

15. The method of claim 13 further comprising:
   determining whether a stepwise template integration process connecting the source system and the target system using selective steps from a complete workflow integration is not already available in a repository of stepwise template integration processes; and
   reusing the stepwise template integration process from the repository of stepwise template integration processes that streamlines the integration process between source systems and target systems.

16. The method of claim 13 wherein selectively including a limited subset of operations from the complete workflow depends on whether the limited set of operations interact with one or more customized source objects or one or more customized target objects from the respective source system or target system.

\* \* \* \* \*